United States Patent
Radekopf et al.

(10) Patent No.: US 10,532,811 B2
(45) Date of Patent: Jan. 14, 2020

(54) METHOD OF MANUFACTURING A CONTROL CUFF FOR A ROTOR BLADE OF A HINGE AND BEARINGLESS ROTOR

(71) Applicant: AIRBUS HELICOPTERS DEUTSCHLAND GMBH, Donauworth (DE)

(72) Inventors: Joerg Radekopf, Schwenningen (DE); Philipp Meierling, Stadtbergen (DE); Ulrich Denecke, Riemerling (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 438 days.

(21) Appl. No.: 15/377,416

(22) Filed: Dec. 13, 2016

(65) Prior Publication Data
US 2017/0283051 A1   Oct. 5, 2017

(30) Foreign Application Priority Data

Mar. 30, 2016   (EP) .................................... 16400007

(51) Int. Cl.
*B64C 27/635* (2006.01)
*B22F 5/00* (2006.01)
(Continued)

(52) U.S. Cl.
CPC .............. *B64C 27/635* (2013.01); *B22F 5/00* (2013.01); *B22F 7/08* (2013.01); *B23C 3/00* (2013.01); *B29C 65/542* (2013.01); *B29C 70/382* (2013.01); *B29D 99/0025* (2013.01); *B32B 37/0038* (2013.01); *B32B 37/1284* (2013.01); *B32B 37/16* (2013.01); *B32B 37/24* (2013.01); *B32B 38/0004* (2013.01); *B64C 27/51* (2013.01); *B64C 27/72* (2013.01); *B23C 2220/48* (2013.01); *B32B 2305/076* (2013.01); *B32B 2603/00* (2013.01); *B32B 2605/18* (2013.01); *B33Y 10/00* (2014.12); *B33Y 80/00* (2014.12); *B64C 2027/7216* (2013.01)

(58) Field of Classification Search
CPC ....... B64C 27/635; B64C 27/33; B64C 27/51; B64C 27/72; B32B 37/1284; B32B 37/0038; B32B 37/16; B32B 37/24; B23C 3/00; B29C 65/542; B29C 70/382; B29D 99/025; B22F 5/00; B22F 7/08
See application file for complete search history.

(56) References Cited

U.S. PATENT DOCUMENTS

| 4,592,701 A | * | 6/1986 | Hahn | ....................... B64C 27/33 416/134 A |
| 4,648,800 A | * | 3/1987 | Fradenburgh | ........... B64C 27/33 416/134 A |

(Continued)

OTHER PUBLICATIONS

Extended European Search Report for European Application No. EP 16400007.7, Completed by the European Patent Office, dated Sep. 6, 2016, 7 pages.

*Primary Examiner* — Brian P Wolcott
(74) *Attorney, Agent, or Firm* — Brooks Kushman P.C.

(57) ABSTRACT

A method of manufacturing a control cuff for a rotor blade of a hinge and bearingless rotor. The method comprises at least the steps of: manufacturing an outer shell, manufacturing a stiffener member by means of an automated process, inserting the stiffener member into the outer shell, and bonding the stiffener member to the outer shell.

20 Claims, 2 Drawing Sheets

(51) Int. Cl.
| | |
|---|---|
| *B22F 7/08* | (2006.01) |
| *B23C 3/00* | (2006.01) |
| *B29C 65/54* | (2006.01) |
| *B29C 70/38* | (2006.01) |
| *B29D 99/00* | (2010.01) |
| *B32B 37/00* | (2006.01) |
| *B32B 37/12* | (2006.01) |
| *B32B 37/16* | (2006.01) |
| *B32B 37/24* | (2006.01) |
| *B32B 38/00* | (2006.01) |
| *B64C 27/51* | (2006.01) |
| *B64C 27/72* | (2006.01) |
| *B33Y 10/00* | (2015.01) |
| *B33Y 80/00* | (2015.01) |

(56) References Cited

U.S. PATENT DOCUMENTS

| | | | |
|---|---|---|---|
| 5,242,267 A * | 9/1993 | Byrnes | B64C 27/48 |
| | | | 416/134 A |
| 5,462,408 A | 10/1995 | Coffy | |
| 9,522,426 B2 * | 12/2016 | Das | B22F 3/1055 |
| 2008/0131280 A1 | 6/2008 | Krauss et al. | |
| 2014/0112785 A1* | 4/2014 | Kuntze-Fechner | B64C 27/33 |
| | | | 416/134 A |
| 2017/0014949 A1* | 1/2017 | Norton | B22F 3/1055 |

\* cited by examiner

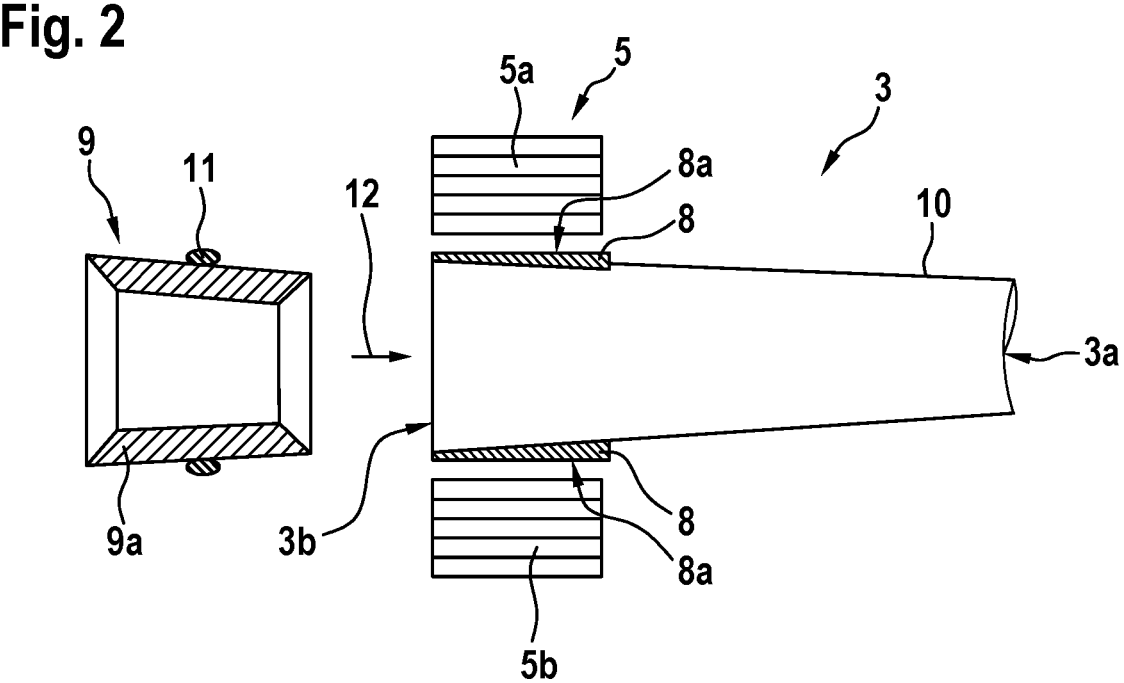
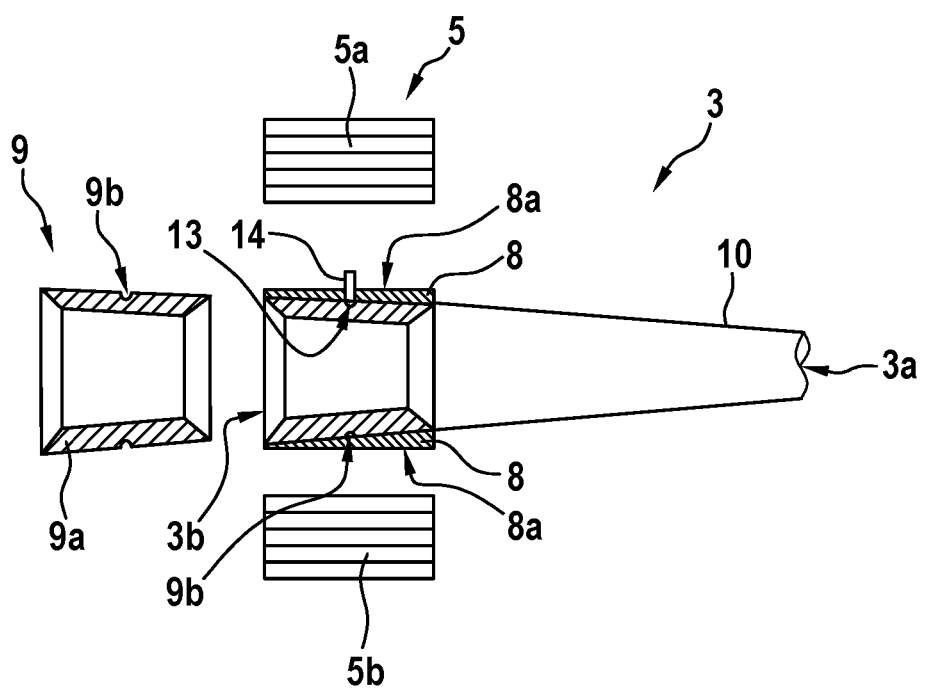

METHOD OF MANUFACTURING A CONTROL CUFF FOR A ROTOR BLADE OF A HINGE AND BEARINGLESS ROTOR

CROSS REFERENCE TO RELATED APPLICATION

This application claims priority to European patent application No. EP 16400007.7 filed on Mar. 30, 2016, the disclosure of which is incorporated in its entirety by reference herein.

BACKGROUND OF THE INVENTION

(1) Field of the Invention

The invention is related to a method of manufacturing a control cuff for a rotor blade of a hinge- and bearingless rotor, the method comprising at least the features of claim 1. The invention is further related to a rotor blade of a hinge- and bearingless rotor with a control cuff that is manufactured according to such a method.

(2) Description of Related Art

In a hinge- and bearingless rotor system, a flexbeam unit is used to connect rotor blades of a multi-blade rotor of a rotary wing aircraft to an associated rotor shaft of the aircraft. During operation, i.e. rotation of the multi-blade rotor, which is hereinafter also referred to as a hinge- and bearingless rotor, the flexbeam unit must withstand and transfer tremendous centrifugal forces that the rotor blades apply thereto, while permitting their flapping, pitch and lead-lag motions. Therefore, the flexbeam unit comprises special, in particular fiber reinforced composite material flexbeam elements that are flexible enough in torsion to allow twisting for blade movement without discrete bearings in the case of a hinge- and bearingless rotor system.

These flexbeam elements usually possess lead-lag-soft regions that permit motions of associated rotor blades in a hinge- and bearingless rotor system in the lead-lag direction. The lead-lag-soft regions thus constitute fictitious vertically oriented axes, so-called virtual lead-lag hinges, about which the rotor blades execute forward and backward lead-lag motions. Furthermore, these flexbeam elements realize flapwise-soft regions that enable flapping of the associated rotor blades in the vertical direction and, thus, constitute fictitious horizontally oriented axes, so-called virtual flapping hinges, about which the associated rotor blades execute upward and downward flapwise motions in a hinge- and bearingless rotor system. The distance between these virtual flapping hinges and the axis of the rotor shaft is referred to as the flapping hinge distance.

Moreover, in a hinge- and bearingless rotor system, these flexbeam elements usually comprise torsion weak regions which enable low-force torsional motion of the flexbeam elements for inducing pitch angle adjustments of the rotor blades, and which allow limiting an associated length of the flexbeam elements. Such torsion weak regions must be resistant against lead-lag and flap shear forces and provide a required stiffness in lead-lag and flapping direction for dynamic reasons. Furthermore, such torsion weak regions should have a small cross section in order to reduce an associated drag of these regions.

For controlling an associated torsion of the torsion weak regions of the flexbeam elements in order to set a current pitch or blade angle of the rotor blades, suitable control cuffs, which are also referred to as pitch horns, are associated with the flexbeam elements and, in particular, with the torsion weak regions. Each control cuff is usually connected to associated control rods that are controlled by suitable servo hydraulic actuators for adjusting the current pitch or blade angle of a given rotor blade in operation.

With respect to the multi-blade rotor of the rotary wing aircraft, the control cuffs are connected to associated root ends of the rotor blades and associated flexbeam heads of the flexbeam elements at predetermined disconnecting points provided at the flexbeam heads of the flexbeam elements. An underlying radial position of these disconnecting points with respect to the rotor shaft of the multi-blade rotor is mainly defined by a given axial length of the control cuffs and the flexbeam elements, and is usually located at a comparatively high radial distance from the rotor shaft.

As the control cuffs cause a disturbance of an aerodynamic airflow at the multi-blade rotor, which disturbance increases with the radial distance of the disconnecting points from the rotor shaft, the given axial length of the control cuffs and their projected profile need to be reduced in order to reduce an associated aerodynamic drag. However, reducing the given axial length of the control cuffs inherently implies reducing an underlying axial length of the flexbeam elements, so that comparatively short and compact flexbeam elements can be provided which allow for a high torsion angle per length unit.

Usually, control cuffs comprise special, in particular fiber reinforced composite material and are manufactured by means of a labor intensive prepreg hand layup method or an infusion process method using preforms. Both methods are, however, only automatable to a certain level and the manufacturing of required stiffener layers, which are mandatory for a required stiffness, constitutes the most time consuming processing part. However, interruption of underlying uni-directional fiber layers in the prepreg hand layup method potentially weakens the control cuffs, so that more layers are necessary for obtaining a required stiffness.

The document U.S. Pat. No. 5,462,408 describes a method of manufacturing a control cuff by means of injection molding from a composite of short reinforcing carbon fibers that are embedded in a polyetheretherketone (PEEK) matrix, i.e. in PEEK resin, which is filled to approximately 30% by mass with reinforcing fibers. The control cuff is solidly attached and surrounded, at each of its axial ends, by a ring, made of metal or ceramic, which constitutes a bearing surface for rotation of the cuff in operation. The rings are solidly attached to the control cuff by means of bonding or shrinking. Furthermore, positioning and attachment of the control cuff on an associated rotor blade is achieved by means of the PPK resin.

However, this method of manufacturing requires use of short reinforcing fiber and is, therefore, time consuming and expensive. Furthermore, due to the use of short reinforcing fibers, a hand layup is required and a potential weakening of the control cuff may occur, which must be compensated by providing a comparatively great number of stiffener layers.

BRIEF SUMMARY OF THE INVENTION

It is, therefore, an object of the present invention to provide a new method of manufacturing a control cuff for a rotor blade of a hinge- and bearingless rotor, which allows at least a reduction of underlying manufacturing costs while allowing manufacturing of a sufficiently stiffened control cuff.

This object is solved by a method of manufacturing a control cuff for a rotor blade of a hinge- and bearingless rotor, the method comprising at least the steps of claim 1.

More specifically, according to the present invention a method of manufacturing a control cuff for a rotor blade of a hinge- and bearingless rotor comprises at least the steps of: Manufacturing an outer shell, manufacturing a stiffener member by means of an automated process, inserting the stiffener member into the outer shell, and bonding the stiffener member to the outer shell.

Advantageously, by manufacturing the stiffener member by means of an automated process, e.g. by means of fiber winding, respective overall manufacturing costs of the control cuff can be reduced. Furthermore, as the stiffener member is preferably manufactured using endless fibers, less material is required and even cheaper material can be used. Thus, the total costs of the hinge- and bearingless rotor according to the present invention can advantageously by reduced. Furthermore, there is no need to use uni-directional weaved material.

However, it should be noted that manufacturing of the stiffener member is not restricted to automated fiber winding. Instead, alternative automated manufacturing methods, such as 3D printing or 3D milling of a metal component for manufacturing the stiffener member, can likewise be employed.

According to a preferred embodiment, the step of manufacturing the stiffener member by means of an automated process comprises manufacturing the stiffener member as a composite component using automated fiber winding technology.

According to a further preferred embodiment, the step of manufacturing the stiffener member by means of an automated process comprises manufacturing the stiffener member as a metal component using automated 3D printing.

According to a further preferred embodiment, the step of manufacturing the stiffener member by means of an automated process comprises manufacturing the stiffener member as a metal component using automated 3D milling.

According to a further preferred embodiment, the step of manufacturing the outer shell comprises manufacturing the outer shell by means of at least one of a wet-layup, prepreg, infusion and injection process.

According to a further preferred embodiment, the step of manufacturing the outer shell comprises creating at least one lead-lag damper attachment layer on the outer shell.

According to a further preferred embodiment, creating the at least one lead-lag damper attachment layer on the outer shell comprises milling the at least one lead-lag damper attachment layer into a shape that is adapted for attachment of an associated lead-lag damper.

According to a further preferred embodiment, the method further comprises the step of applying an adhesive on an outer surface of the stiffener member prior to inserting the stiffener member into the outer shell, wherein the stiffener member is bonded to the outer shell by means of the adhesive.

According to a further preferred embodiment, the step of applying an adhesive on an outer surface of the stiffener member prior to inserting the stiffener member into the outer shell comprises applying an adhesive line on the outer surface of the stiffener member.

According to a further preferred embodiment, the step of manufacturing the outer shell comprises providing the outer shell with an adhesive feed line, wherein the step of manufacturing the stiffener member comprises creating an injection channel on an outer surface of the stiffener member.

According to a further preferred embodiment, the step of inserting the stiffener member into the outer shell comprises creating a bonding gap between an inner surface of the outer shell and an outer surface of the stiffener member by means of the injection channel.

According to a further preferred embodiment, the step of bonding the stiffener member to the outer shell comprises injecting adhesive via the feed line into the bonding gap.

According to a further preferred embodiment, the step of manufacturing the stiffener member comprises manufacturing the stiffener member in the form of a stiffener belt.

According to a further preferred embodiment, the method further comprises the step of shaping an outer surface of the outer shell according to predetermined shaping parameters by means of an automated milling process.

The invention further provides a rotor blade of a hinge- and bearingless rotor with a control cuff that is manufactured according to the manufacturing method described above.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 2 shows a method of manufacturing the control cuff of FIG. 1 according to a first embodiment, and FIG. 3 shows a method of manufacturing the control cuff of FIG. 1 according to a second embodiment.

DETAILED DESCRIPTION OF INVENTION

Figure 1:
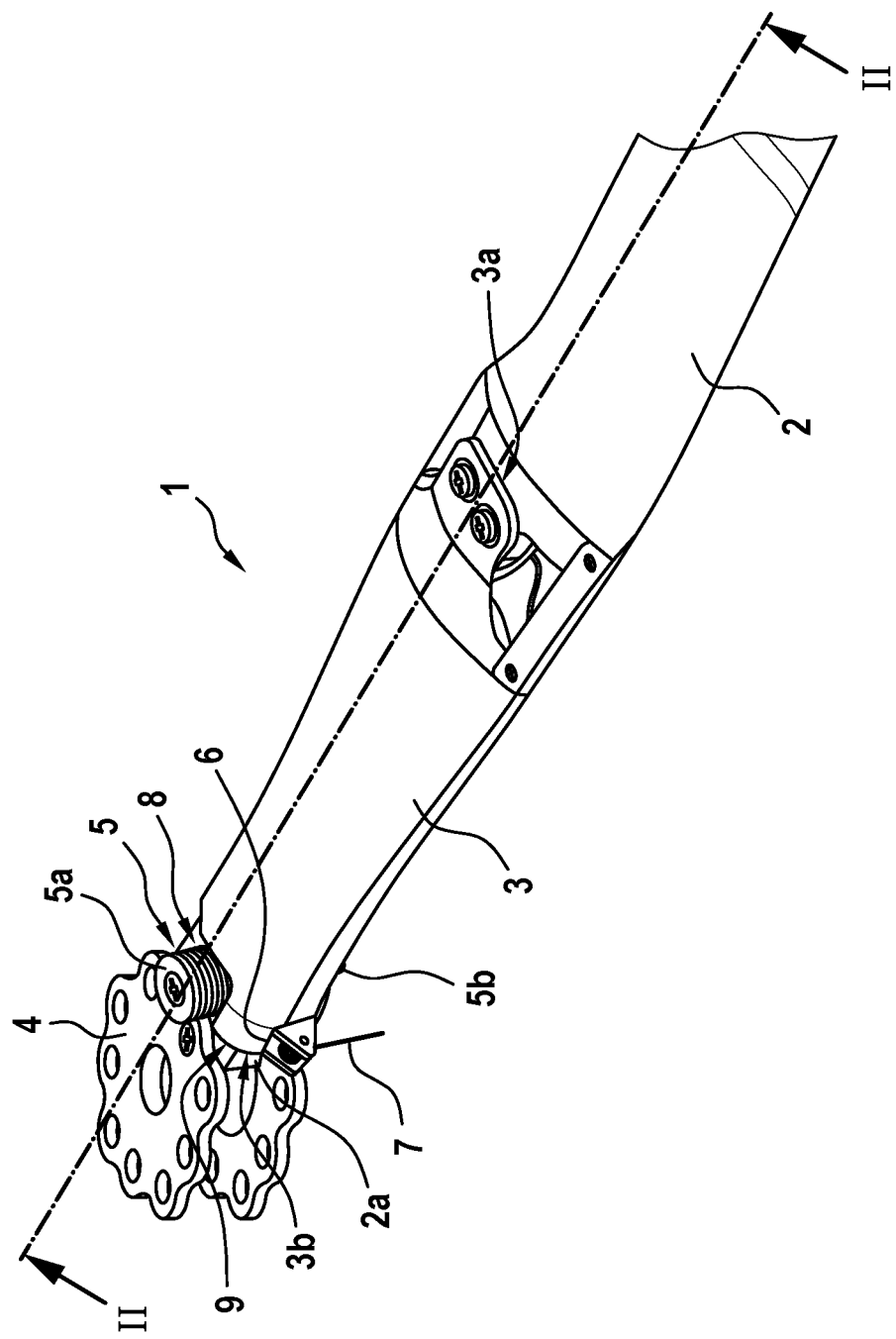
FIG. 1 shows a perspective view of a rotor blade of a hinge- and bearingless rotor having a control cuff according to the invention.

FIG. 1 shows a multi-blade rotor 1 of a rotary wing aircraft, in particular a multi-blade rotor for a main rotor of a helicopter. The multi-blade rotor 1 illustratively comprises a plurality of rotor blades. However, for purposes of simplicity and clarity of the drawings, only a single rotor blade is partly shown and referred to by the reference sign 2. This rotor blade 2 is preferably equipped with a control cuff 3 that is usable for setting a current pitch or blade angle of the rotor blade 2 in operation.

According to one aspect, the multi-blade rotor 1 is embodied as hinge- and bearingless rotor having a flexbeam element 2a as interface between a rotor hub 4 of the multi-blade rotor 1 and the rotor blade 2. The rotor hub 4 is preferably rigidly mounted to a rotor shaft or mast of the hinge- and bearingless rotor 1, or embodied as an integral part thereof. It should, however, be noted that the rotor blade 2 is not shown in greater detail, neither in FIG. 1 nor in the remaining figures, for simplicity and clarity of the drawings.

Illustratively, the flexbeam element 2a is at least partly and, preferably, essentially arranged inside of the control cuff 3. One axial end of the flexbeam element 2a is attached to the rotor hub 4 and its other axial end is attached to a root end of the rotor blade 2. This root end of the rotor blade 2 is preferably likewise attached to an outer end 3a of the control cuff 3, while an inner end 3b of the control cuff 3 is arranged adjacent to the rotor hub 4.

According to one aspect, the control cuff 3 is provided with a lead-lag damper unit 5 having at least two lead-lag dampers 5*a*, 5*b* arranged in the region of the inner end 3*b* of the control cuff 3. Preferably, the control cuff 3 is further provided with at least one control rod attachment 6, to which preferentially at least one activatable control rod 7 is connected. The latter is preferably activated in operation for rotating the control cuff 3 around its associated longitudinal axis for setting a current pitch or blade angle of the rotor blade 2.

In order to enable attachment of the lead-lag dampers 5*a*, 5*b* in the region of the inner end 3*b* of the control cuff 3, the inner end 3*b* is preferably provided with one or more lead-lag damper attachment layers 8. Furthermore, in order to enable attachment of the at least one control rod attachment 6 in the region of the inner end 3*b* of the control cuff 3, the inner end 3*b* is preferably provided with a stiffener member 9. The one or more lead-lag damper attachment layers 8 are preferentially arranged on an outer circumference of the inner end 3*b* of the control cuff 3, while the stiffener member 9 is preferably arranged on an inner circumference thereof. The control cuff 3 is preferentially manufactured as described below with reference to FIG. 2 or FIG. 3.

FIG. 2 shows an exemplary method of manufacturing the control cuff 3 of FIG. 1 according to one aspect. This method is illustrated with respect to a sectional exploded view of the control cuff 3 of FIG. 1, seen in direction of a sectional line II of FIG. 1.

Initially, an outer shell 10 of the control cuff 3 is manufactured, which is at least to be provided with the stiffener member 9. Preferably, the outer shell 10 is manufactured by means of at least one of a wet-layup, prepreg, infusion and injection process.

The stiffener member 9 is preferentially manufactured by means of an automated process. Advantageously, manufacturing of the stiffener member 9 can be performed completely independent of the manufacturing of the outer shell 10, i.e. prior to, simultaneously with or after manufacturing of the outer shell 10.

According to one aspect, the step of manufacturing the stiffener member 9 by means of an automated process comprises manufacturing the stiffener member 9 as a composite component using automated fiber winding technology. Thus, fibers can be used instead of fiber layers of multi-axial layers, so that an otherwise required pre-manufacturing process can be avoided and costs can be saved.

However, it should be noted that the step of manufacturing the stiffener member 9 by means of an automated process is not limited to use of automated fiber winding and that other manufacturing processes are likewise contemplated, such as e.g. manufacturing the stiffener member 9 as a metal component using automated 3D printing or manufacturing the stiffener member 9 as a metal component using automated 3D milling. In other words, the stiffener member 9 is preferably pre-manufactured, preferentially in the form of a stiffener belt or ring 9*a*, and provided as a separate component, which must subsequently be mounted to the outer shell 10.

Mounting of the stiffener member 9 preferably comprises securely fixing the stiffener member 9 in the outer shell 10. More specifically, according to one aspect, the stiffener member 9 is inserted into the outer shell 10, as illustrated with an arrow 12. Preferably, the stiffener member 9 is located, as described above with reference to FIG. 1, at the inner end 3*b* of the control cuff 3. Illustratively, the outer shell 10 and the stiffener member 9 are at least partly conically shaped. The stiffener member 9 is then bonded to the outer shell 10.

Preferably, an adhesive 11 is applied on an outer surface of the stiffener member 9 prior to inserting the stiffener member 9 into the outer shell 10, as indicated in FIG. 1. Thus, the stiffener member 9 can be bonded to the outer shell 10 by means of the adhesive 11. Preferentially, the adhesive 11 is applied to the outer surface or outer circumference of the stiffener member 9 in the form of an adhesive line so that the adhesive line forms at least partly an adhesive ring around the belt- or ring-shaped stiffener member 9.

Furthermore, according to one aspect at least one lead-lag damper attachment layer 8 is created on the outer shell 10. This can be done in any suitable manner, even one that is already well-known to the person skilled in the art, and is illustratively performed prior to bonding of the stiffener member 9 to the outer shell 10. However, the at least one lead-lag damper attachment layer 8 can also be provided, i.e. created after the bonding is finished.

Preferably, the at least one lead-lag damper attachment layer 8 provided on the outer shell 10 is milled into a shape 8*a* that is adapted for attachment of the lead-lag dampers 5*a*, 5*b* of FIG. 1. This can also be done in any suitable manner, even one that is already well-known to the person skilled in the art. The lead-lag dampers 5*a*, 5*b* are then attached to the at least one lead-lag damper attachment layer 8.

FIG. 3 shows an alternative method of manufacturing the control cuff 3 of FIG. 1. This alternative method essentially corresponds to the method described above with reference to FIG. 2 and is also illustrated with respect to a sectional exploded view of the control cuff 3 of FIG. 1, seen in direction of the sectional line II of FIG. 1.

However, in contrast to the method described above with reference to FIG. 2, the stiffener member 9 now comprises an injection channel 9*b* on its outer surface or outer circumference. More specifically, the stiffener member 9, which is preferably again provided as the stiffener belt or ring 9*a* of FIG. 2, now preferentially comprises an annular groove on its outer surface or outer circumference that defines the injection channel 9*b*. This injection channel 9*b* is preferably created during the automated fiber winding of the stiffener member 9, as described above with reference to FIG. 2.

According to one aspect, the stiffener member 9 with the injection channel 9*b* is inserted into the outer shell 10 of the control cuff 3, preferably in direction of the arrow 12 of FIG. 2 and prior to applying an adhesive thereto. It should be noted that the stiffener member 9 is shown twice in FIG. 3: one time on the outside of the outer shell 10, i.e. on the left hand side of FIG. 3, for clearly illustrating the injection channel 9*b*, and one time inside of the outer shell 10 for illustrating subsequent method steps.

Preferably, the injection channel 9*b* is defined such that after insertion of the stiffener member 9 into the outer shell 10 a bonding gap 13 occurs between the stiffener member 9 and the outer shell 10. More specifically, the bonding gap 13 is preferentially created between an inner surface of the outer shell 10 and an outer surface of the stiffener member 9 by means of the injection channel 9*b* when inserting the stiffener member 9 into the outer shell 10.

Then, the outer shell 10 is provided with an adhesive feed line 14, which is preferably connected with the injection channel 9*b* through a suitable opening in the outer shell 10. This suitable opening is preferentially embodied in the region of the injection channel 9*b* and, illustratively, traversing the lead-lag damper attachment layers 8. Thus, by injecting adhesive via the feed line 14 into the bonding gap 13, the stiffener member 9 can be bonded to the outer shell 10.

It should be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention.

Furthermore, additional or supplementary method steps for fine-tuning of the control cuff 3 of FIG. 1 according to the present invention, which can be well-known to the person skilled in the art and which can be performed during or after execution of the method steps described above with reference to FIG. 2 and FIG. 3, can also be performed and are likewise considered as being part of the invention. For instance, subsequent to the method steps according to FIG. 2 or FIG. 3, an outer surface or outer circumference of the outer shell 10 can be shaped according to predetermined shaping parameters. This can e.g. be done by means of an automated milling process, which is well-known to the person skilled in the art.

REFERENCE LIST 1 hinge- and bearingless main rotor
2 rotor blade
2a flexbeam element
3 control cuff
3a outer end of control cuff
3b inner end of control cuff
4 rotor hub
5 lead-lag damper unit
5a, 5b lead-lag dampers
6 control rod attachment
7 control rod
8 lead-lag damper attachment layers
8a attachment layer shape
9 stiffener member
9a stiffener belt
9b injection channel
10 control cuff outer shell
11 adhesive
12 insertion direction
13 bonding gap
14 adhesive feed line

What is claimed is:

1. A method of manufacturing a control cuff for a rotor blade of a hinge- and bearingless rotor, the control cuff being adapted for accommodation of a flexbeam element of the rotor and comprising a control rod attachment for connection to an activatable control rod that is activatable for rotating the control cuff in operation around its associated longitudinal axis for setting a current pitch or a blade angle of the rotor blade, the method comprising at least the steps of:
   manufacturing an outer shell of the control cuff,
   manufacturing a stiffener member by means of an automated process,
   inserting the stiffener member into the outer shell, and
   bonding the stiffener member to the outer shell, in a region of the control rod attachment.

2. The method of claim 1, wherein the step of manufacturing the stiffener member by means of an automated process comprises manufacturing the stiffener member as a composite component using automated fiber winding technology.

3. The method of claim 1, wherein the step of manufacturing the stiffener member by means of an automated process comprises manufacturing the stiffener member as a metal component using automated 3D printing.

4. The method of claim 1, wherein the step of manufacturing the stiffener member by means of an automated process comprises manufacturing the stiffener member as a metal component using automated 3D milling.

5. The method of claim 1, wherein the step of manufacturing the outer shell comprises manufacturing the outer shell by means of at least one of a wet-layup, prepreg, infusion and injection process.

6. The method of claim 5, wherein the step of manufacturing the outer shell comprises creating at least one lead-lag damper attachment layer on the outer shell.

7. The method of claim 6, wherein creating the at least one lead-lag damper attachment layer on the outer shell comprises milling the at least one lead-lag damper attachment layer into a shape that is adapted for attachment of an associated lead-lag damper.

8. The method of claim 1, further comprising applying an adhesive on an outer surface of the stiffener member prior to inserting the stiffener member into the outer shell, wherein the stiffener member is bonded to the outer shell by means of the adhesive.

9. The method of claim 8, wherein the step of applying an adhesive on an outer surface of the stiffener member prior to inserting the stiffener member into the outer shell comprises applying an adhesive line on the outer surface of the stiffener member.

10. The method of claim 1, wherein the step of manufacturing the outer shell comprises providing the outer shell with an adhesive feed line, and wherein the step of manufacturing the stiffener member comprises creating an injection channel on an outer surface of the stiffener member.

11. The method of claim 10, wherein the step of inserting the stiffener member into the outer shell comprises creating a bonding gap between an inner surface of the outer shell and the outer surface of the stiffener member by means of the injection channel.

12. The method of claim 11, wherein the step of bonding the stiffener member to the outer shell comprises injecting adhesive via the feed line into the bonding gap.

13. The method of claim 1, wherein the step of manufacturing the stiffener member comprises manufacturing the stiffener member in the form of a stiffener belt.

14. The method of claim 1, further comprising shaping an outer surface of the outer shell according to predetermined shaping parameters by means of an automated milling process.

15. A rotor blade of a hinge- and bearingless rotor with a control cuff that is manufactured according to claim 1.

16. A method of manufacturing a control cuff for a rotor blade of a hinge- and bearingless rotor, the method comprising at least the steps of:
   manufacturing an outer shell,
   manufacturing a stiffener member by means of an automated process,
   inserting the stiffener member into the outer shell, and
   bonding the stiffener member to the outer shell,
   wherein the step of manufacturing the outer shell comprises providing the outer shell with an adhesive feed line, and wherein the step of manufacturing the stiffener member comprises creating an injection channel on an outer surface of the stiffener member.

17. The method of claim 16, wherein the step of inserting the stiffener member into the outer shell comprises creating a bonding gap between an inner surface of the outer shell and the outer surface of the stiffener member by means of the injection channel.

18. The method of claim 17, wherein the step of bonding the stiffener member to the outer shell comprises injecting adhesive via the feed line into the bonding gap.

19. A method of manufacturing a control cuff for a rotor blade of a hinge- and bearingless rotor, the method comprising:
- manufacturing an outer shell of a control cuff, the outer shell of the control cuff extending from an inner end region of the control cuff to an outer end region of the control cuff, the inner end region adapted to be arranged adjacent to a rotor hub, the outer end region adapted to be attached to a root end of the rotor blade,
- manufacturing a stiffener member of the control cuff via an automated process,
- inserting the stiffener member into the outer shell and positioning the stiffener member within the inner end region, and
- bonding an outer surface of the stiffener member to an inner surface of the outer shell such that the outer shell and stiffening member are adapted to accommodate and surround a flexbeam element, and
- providing a control rod attachment on the control cuff within the inner end region, the control rod attachment for connection to an activatable control rod that is activatable for rotating the control cuff in operation around its associated longitudinal axis for setting a current pitch or a blade angle of the rotor blade.

20. The method of claim 19, wherein the stiffener member is positioned to be spaced apart from the outer end region of the control cuff, and
wherein the stiffener member is manufactured in the form of a stiffener belt.

* * * * *